United States Patent [19]

Tiberg

[11] Patent Number: 4,570,708

[45] Date of Patent: Feb. 18, 1986

[54] METHOD OF USING PIPES RESISTANT TO HYDROSULPHURIC ACID

[75] Inventor: Jan Tiberg, Hofors, Sweden

[73] Assignee: SKF Steel Engineering AB, Hofors, Sweden

[21] Appl. No.: 486,735

[22] Filed: Apr. 20, 1983

[30] Foreign Application Priority Data

Apr. 30, 1982 [SE] Sweden ............................. 8202728

[51] Int. Cl.$^4$ .......................... E21B 17/00; C21D 7/02
[52] U.S. Cl. .................................... 166/244.1; 166/68; 148/36; 138/177; 72/365
[58] Field of Search .................. 148/36, 38, 37, 12 B; 75/123 L, 126 G, 128 E; 138/177

[56] References Cited

U.S. PATENT DOCUMENTS

| 4,046,600 | 9/1977 | Yamakoshi et al. | 148/36 |
| 4,226,645 | 10/1980 | Waid et al. | 148/36 |
| 4,354,882 | 10/1982 | Greer | 148/36 |
| 4,371,394 | 2/1983 | Henthorne et al. | 148/38 |
| 4,390,367 | 6/1983 | Niehaus et al. | 148/38 |
| 4,483,722 | 11/1984 | Freeman | 148/36 |

FOREIGN PATENT DOCUMENTS 0021349 1/1981 Japan ..................... 148/36

OTHER PUBLICATIONS

Treseder, R. S. et al., *Factors in Sulfide Corrosion Cracking of High Strength Steels*, Corrosion, pp. 31–37, 2-68.

*Primary Examiner*—L. Dewayne Rutledge
*Assistant Examiner*—Deborah Yee
*Attorney, Agent, or Firm*—Armstrong, Nikaido, Marmelstein & Kubovcik

[57] ABSTRACT

High-strength pipes are manufactured from cold-deformed carbon steel or alloyed steel for use in acid environment, in which the $H_2S$ partial pressure in gaseous phase may exceed 300 Pa or in which the $H_2S$ content in liquid phase may have a corresponding equilibrium pressure and/or in which $CO_2$ and other acidifying substances may be present. The weight % composition of the steel is preferably:

C 0–1.20%
Si 0–1.0%
Mn 0–3.0%
Cr 0–2.0%
Ni 0–1.0%
Mo 0–1.0%
Cu 0–1.0%
V 0–0.3%
Nb 0–0.2%
Ca 0–0.05%
Fe+incidental ingredients and impurities up to 100%.

9 Claims, No Drawings

METHOD OF USING PIPES RESISTANT TO HYDROSULPHURIC ACID

DESCRIPTION

The present invention relates to high-strength pipes for use in acid environment, in which the $H_2S$ partial pressure in gaseous phase may exceed 300 Pa or in which the $H_2S$ content in liquid phase may have a corresponding equilibrium pressure and/or in which $CO_2$ and even other acidifying substances may be present. These pipes are intended primarily for use as production pipes in acid oil wells.

An estimated 20% of all oil wells being worked today are acid, and this figure is likely to increase. This means, for instance, that hydrosulphuric acid is present in gaseous or liquid phase. Other corrosive substances may also be present, but $H_2S$ causes particular problems with respect to high-strength steels.

When the $H_2S$ content in gaseous phase exceeds about 300 Pa a phenomenon occurs which is known as "sulphide stress cracking", SSC. This cracking reduces the strength of the steel to far below its normal rupture and yield points.

Nowadays oil is extracted from depths of down to 10,000 m and sometimes even deeper. The gas pressure in these deep wells is often extremely high and the demands made on the steel used in the pipes are thus considerable.

Each Oil Company has Specifications for the pipes to be used for acid oil wells, prescribing first of all either high or low alloyed and toughened steels. Furthermore, these steels may not have been cold-worked. Cold-straightening is accepted by one or two companies, but only provided stress-relieving annealing is performed thereafter under carefully specified conditions. Low-alloyed, toughened steel pipes, and sometimes high-alloyed steel pipes are usually used for the high-strength production pipes in $H_2S$ environment nowadays. The drawbacks with both these types of pipe include their being expensive, having poorer tolerances and surfaces than pipes made of normal carbon steel or low-alloyed steel and furthermore being more difficult to machine. The object of the present invention, therefore is to eliminate the above drawbacks.

This is achieved according to the present invention by a pipe for use in an acid environment as defined above, manufactured from a cold-deformed carbon steel or low-alloyed steel.

According to a preferred embodiment of the invention the steel is annealed and the annealing temperature is preferably ca 400°–675° C.

According to another embodiment of the invention the steel has the following composition in weight %.

C 0–1.20%
Si 0–1.0%
Mn 0–3.0%
Cr 0–2.0%
Ni 0–1.0%
Mo 0–1.0%
Cu 0–1.0%
V 0–0.3%
Nb 0–0.2%
Ca 0–0.05%
Fe+incidental ingredients and impurities up to 100%

According to yet another embodiment of the invention the steel has the following composition in weight %.

C 0.05–0.40%
Si 0.10–0.50%
Mn 0.6–2.0%
Cr 0.0–0.50%
Ni 0.0–1.0%
Cu 0.0–0.50%
V 0.0–0.20%
Nb 0.0–0.10%
Ca 0.0–0.005%
Fe+incidental ingredients and impurities up to 100%

According to yet another embodiment of the invention, the steel has the following composition in weight %.

C 0.10–0.25%
Si 0.10–0.50%
Mn 0.80–1.80%
Cr 0.0–0.40%
Ni 0.0–1.0%
Cu 0.0–0.50%
V 0.0–0.20%
Nb 0.0–0.10%
Ca 0.0–0.005%
Fe+incidental ingredients and impurities up to 100%

According to yet another embodiment of the invention the steel has an extremely low sulphur content, ca 0.0–0.005% S. Normal sulphur contents are between ca 0.005–0.050% S.

As intimated above, cold-working produces better surfaces and tolerances, better machinability than after toughening, and most importantly, considerably lower costs in comparison with high or low-alloyed and toughened.

It has now quite surprisingly been found that better resistance to SSC is obtained with steel pipes according to the invention than with high-alloyed or toughened, low-alloyed steel, which was earlier considered quite unthinkable. Reference is made here to NACE Standard Mr-01-75 (1980 Revision) "Material Requirement—Sulphide Stress Cracking Resistant Metallic Material for Oil Field Equipment", issued by the National Association of Corrosion Engineers. This standard in turn refers primarily to the API standards 5A and 5AX. It is clear from this standard that low-alloyed, high-strength, cold-worked steel is unthinkable for extracting oil from acid oil wells.

Experiments performed, described in the Examples, show however that even better resistance is obtained for cold-worked, annealed, low-alloyed steels according to the present invention than with the steel grades previously stipulated. The theory behind this phenomenon has not been fully determined, but a contributory factor may well be that the cold-deformation results in increased dislocation density, thus increasing the strength of the steel. During annealing at moderate temperature, i.e. 500°–650° C., inner stresses are caused in the material, which might otherwise contribute to SSC, without the dislocation density being two significantly reduced.

The steel strength is thus obtained by working the steel. According to one embodiment of the invention the pipe is manufactured by means of cold-rolling. The degree of cold-deformation shall then be at least 10%, preferably at least 30%. The lower yield point of the steel shall be at least 550 MPa, preferably at least 650 MPa.
}

According to another embodiment of the invention the pipe is manufactured by means of cold-drawing. In this case the degree of cold-working shall be at least 10% and shall have a lower yield point of at least 550 MPa. Besides their application as production pipes for oil drilling, i.e. tubing, the pipes according to the present invention can also be used for lining extremely deep drill-holes, i.e. casing, and also for the manufacture of drill-pipe as well as other applications in drill-holes, such as couplings, valves, packings, etc.

The following Example is given to illustrate the invention. A comparative experiment is also described.

In this Example, pipes manufactured from grade SKF 280 steel, in the first case cold-worked and annealed (1.5 h at 515° C.) in accordance with the invention and in the second case hardened and annealed (2 h at 570° C.) (comparison), were tested.

Table 1 shows the chemical analysis in weight of the steel tested and Table 2 shows the mechanical properties of the test pieces of cold-rolled or hardened, annealed SKF 280.

TABLE 1

| | |
|---|---|
| C | 0.18% |
| Si | 0.37% |
| Mn | 1.46% |
| P | 0.014% |
| S | 0.020% |
| Cr | 0.07% |
| Ni | 0.06% |
| Mo | 0.02% |
| V | 0.10% |

TABLE 2

| (Mechanical properties) | | |
|---|---|---|
| | Cold-rolled | Toughened |
| $R_{cL}$ (MPa) | 840 | 866 |
| $R_M$ (MPa) | 910 | 906 |
| $A_5$ (%) | 19 | 19 |
| Z (%) | 59 | 64 |
| HB | 269 | 300 | balance Fe and incidental ingredients and impurities up to 100%.

The following test environments were used:
1. 5% NaCl, saturated $H_2S$ = cotton solution
2. 5% NaCl, saturated $H_2S$ + 0.5 $HA_c$ = NACE solution The testing method used was the 3-point bending test and the testing time was 100 h. An applied loading in the outer fibre of up to 800 MPa was applied and in test environment 1, both the invention pipe and the comparison pipe were satisfactory. However, in test environment 2, the invention pipe was satisfactory but the comparison pipe ruptured at an applied load of about 400 MPa and again at about 600 MPa.

These results show that the cold-rolled pipes used according to the present invention are more resistant to $H_2S$ stress corrosion than the toughened pipes.

The conclusion can be drawn from the results obtained that the cold-rolled pipes, i.e. of SKF 280, according to the invention are at least as good as the toughened pipes of types 4130 or 4140 or other 41xx types conventionally recommended for use in acid wells.

I claim:

1. A method of using a high-strength steel pipe in an acid-environment comprising immersing and using said pipe in a fluid having an $H_2S$ partial pressure in a gaseous phase of at least 300 Pa or in which the $H_2S$ content in the liquid phase has a corresponding equilibrium pressure, said pipe being a high-strength pipe manufactured from a cold-deformed carbon steel or low alloyed steel having the following composition by weight:

C 0–1.20%
Si 0–1.0%
Mn 0–3.0%
Cr 0–2.0%
Ni 0–1.0%
Mo 0–1.0%
Cu 0–1.0%
V 0–0.3%
Nb 0–0.2%
Ca 0–0.05%
Fe+incidental ingredients and impurities up to 100%;

wherein the degree of cold-deformation is at least 10% and wherein said pipe is used in said cold-deformed condition without subsequent toughening by austenitizing.

2. A method according to claim 1, wherein the steel is annealed.

3. A method according to claim 2, wherein the annealing temperature is ca 400°–675° C.

4. A method according to claim 1, wherein the steel contains up to 0.005% by weight sulphur.

5. A method according to claim 1, wherein the lower yield point of the steel is at least 550 MPa.

6. A method according to claim 1 wherein the steel has the following composition by weight:

C 0.05–0.40%
Si 0.10–0.50%
Mn 0.6–2.0%
Cr 0.0–0.50%
Ni 0.0–1.0%
Cu 0.0–0.50%
V 0.0–0.20%
Nb 0.0–0.10%
Ca 0.0–0.005%
Fe+incidental ingredients and impurities up to 100%.

7. A method according to claim 1 wherein the steel has the following composition by weight:

C 0.10–0.25%
Si 0.10–0.50%
Mn 0.80–1.80%
Cr 0.0–0.40%
Ni 0.0–1.0%
Cu 0.0–0.50%
V 0.0–0.20%
Nb 0.0–0.10%
Ca 0.0–0.005%
Fe+incidental ingredients and impurities up to 100%.

8. A method according to claim 1, wherein the pipe is manufactured by cold-rolling.

9. A method according to claim 1, wherein the pipe is manufactured by cold-drawing.

* * * * *